(12) United States Patent
Salvador et al.

(10) Patent No.: US 7,344,184 B2
(45) Date of Patent: Mar. 18, 2008

(54) INTEGRATED LOADING RAMP SYSTEM

(75) Inventors: Christopher Salvador, Raymond, OH (US); Douglas Kaltenmark, Raymond, OH (US); Kris Lemmon, Raymond, OH (US)

(73) Assignee: Honda Motor Co., Inc., Tokyo (JP)

( * ) Notice: Subject to any disclaimer, the term of this patent is extended or adjusted under 35 U.S.C. 154(b) by 132 days.

(21) Appl. No.: 11/286,565

(22) Filed: Nov. 23, 2005

(65) Prior Publication Data

US 2007/0114813 A1 May 24, 2007

(51) Int. Cl.
*B62D 33/23* (2006.01)
(52) U.S. Cl. .................... 296/183.1; 296/61
(58) Field of Classification Search ........... 296/183.1, 296/37.6, 51, 61; 414/537; 14/69.5; 119/847
See application file for complete search history.

(56) References Cited

U.S. PATENT DOCUMENTS

| 3,510,015 | A |   | 5/1970  | Roshaven |
| 3,737,058 | A |   | 6/1973  | Johnson |
| 4,003,483 | A | * | 1/1977  | Fulton ................. 414/537 |
| 4,990,049 | A |   | 2/1991  | Hargrove |
| 5,553,762 | A |   | 9/1996  | Brown |
| 6,158,798 | A |   | 12/2000 | Stedtfeld et al. |
| 6,575,516 | B2 | * | 6/2003 | Webber ................. 296/61 |
| 6,644,708 | B1 | * | 11/2003 | Grzegorzewski et al. ..... 296/32 |
| 6,811,067 | B2 | * | 11/2004 | Muizelaar et al. .......... 224/404 |
| 6,843,519 | B2 | * | 1/2005  | Ojanen ................. 296/50 |
| 2003/0015885 | A1 | * | 1/2003 | Landwehr ............... 296/61 |
| 2003/0071476 | A1 | * | 4/2003 | Schilling ............... 296/61 |
| 2003/0168874 | A1 | * | 9/2003 | Bautista ............... 296/10 |
| 2005/0057073 | A1 | * | 3/2005 | Hunt ................ 296/183.1 |
| 2006/0232089 | A1 | * | 10/2006 | Drabik et al. ............. 296/61 |

* cited by examiner

*Primary Examiner*—Jason S Morrow
(74) *Attorney, Agent, or Firm*—Jason H. Foster; Kremblas, Foster, Phillips & Pollick

(57) ABSTRACT

The invention is a ramp removably mounted to at least one sidewall of a cargo bed of a vehicle. The ramp can be removed to create a support bridge between the cargo bed and the ground. The cargo bed of the preferred embodiment has four sidewalls, and the ramp is mounted to one sidewall of the cargo bed, preferably by a hinge and locking mechanism. One of the sidewalls of the cargo bed is a tailgate having a groove for accepting a lip on the end of the ramp, while the opposite end of the ramp rests upon the ground. Then a motorcycle, ATV, tractor or other wheeled vehicle can be loaded or unloaded easily, and the ramps are readily available and securely stored.

4 Claims, 4 Drawing Sheets

INTEGRATED LOADING RAMP SYSTEM

BACKGROUND OF THE INVENTION

1. Field of the Invention

This invention relates generally to vehicle accessories, and more specifically to loading ramps.

2. Description of the Related Art

When the driver of a vehicle having an open cargo space, such as a truck bed, decides to load a wheeled vehicle into the cargo space, loading ramps are necessary because the distance between the floor of the truck bed and the ground is normally too great to drive the wheeled vehicle directly into the cargo space. Ramps are conventionally used to bridge this distance by forming a durable support structure to drive the wheeled vehicle up and into the cargo space.

Traditionally, when a driver wants to load a wheeled vehicle, such as a lawn mower, into the bed of his truck, he releases the tailgate then extends at least two support structures or ramps between the bed and the ground. The ramps seat against the tailgate at one end and against the ground at the opposite end, creating about a 45 degree or smaller angle with the ground. Once the ramps are in place, the driver loads the lawn mower into the bed of the truck. Because of the size of the mower deck, little room is left for additional materials to be stored in the bed. However, it is important to take the ramps to the next location so that the driver can unload the lawn mower. Therefore, storage of the ramps and any other materials is an issue.

Conventional ramps are made from any variety of supportive materials, including wood, plastic, aluminum and other metals. Traditionally, loading ramps have been stored in the truck bed along with the wheeled vehicle. The ramps typically take up a large amount of storage space in the bed. This is even more important when the truck bed is short and extra storage space cannot be spared.

Storing the ramps during transit between loading and unloading sites becomes a challenge for the driver when using conventional loading ramps, which are stored in the truck bed with the wheeled vehicle. However, this may not be possible or safe depending on the size of the wheeled vehicle. Further, conventional ramps can be stacked along an exterior side of the truck, in the same way that a painter carries ladders on his truck by hanging them on a rack. However, this requires an additional accessory to attach or strap the ramps to the truck, which can be cumbersome and time consuming to install.

Therefore, there is a need for a method and apparatus for storing loading ramps in a cargo space that does not require additional attachment accessories or encroach on the storage area of the cargo space.

BRIEF SUMMARY OF THE INVENTION

The invention is a ramp removably mounted to at least one sidewall of a cargo bed of a vehicle for removing to create a support bridge between the cargo bed and a surface spaced from the cargo. The cargo bed of the preferred embodiment has four sidewalls, and the ramp is mounted to one of the sidewalls, preferably by a hinge and locking mechanism. Preferably there is one sidewall of the cargo bed that is a tailgate having a groove for accepting a lip on an end of the ramp, while the opposite end of the ramp rests upon a designated surface. The method for using the ramp in a vehicle includes removably mounting the ramp to at least one sidewall of the cargo bed of the vehicle.

BRIEF DESCRIPTION OF THE SEVERAL VIEWS OF THE DRAWINGS

FIG. 1A is an enlarged top view in section illustrating the embodiment of FIG. 1 through the line 1A-1A.

Figure 1:
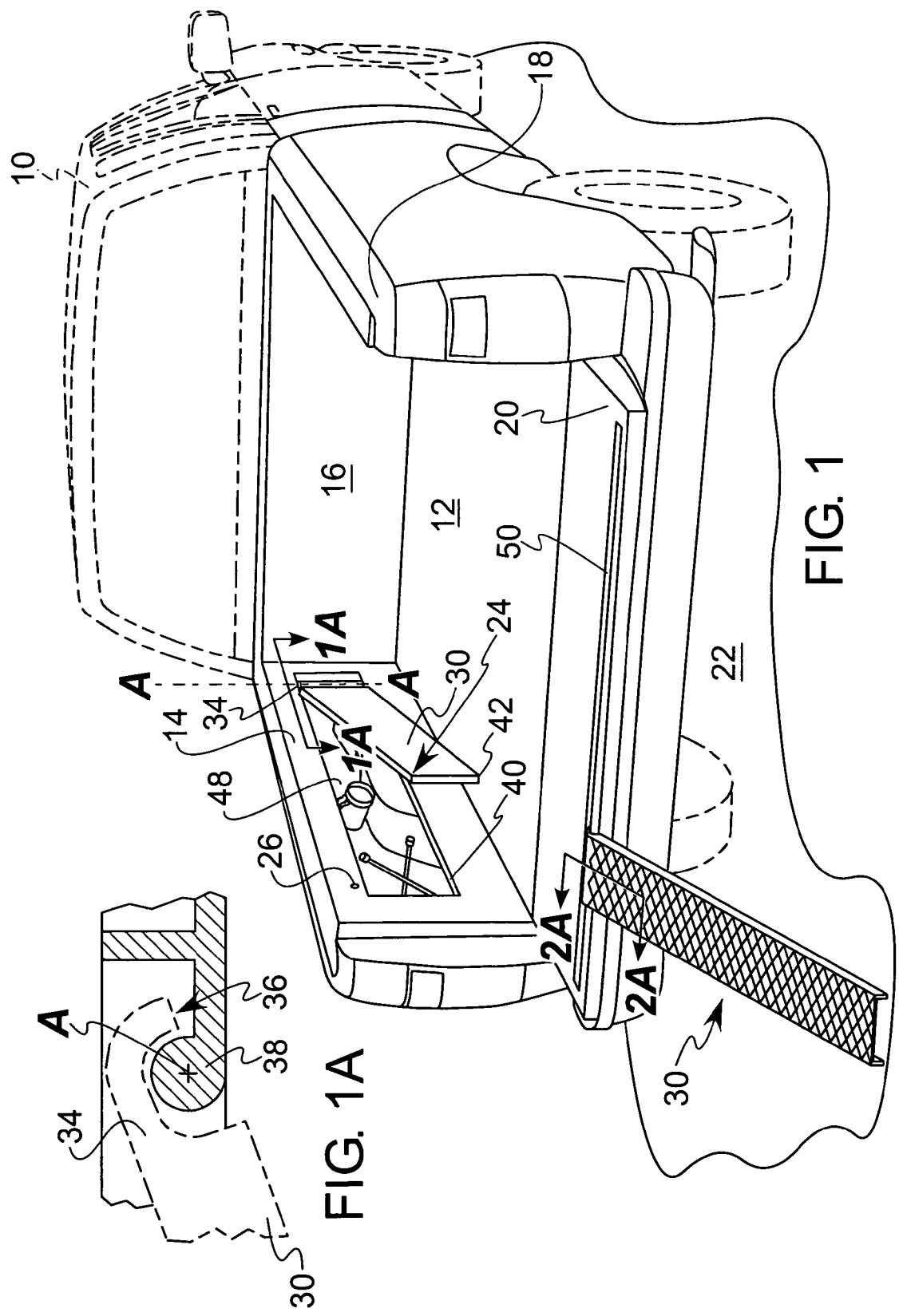
FIG. 1 is a view in perspective illustrating the preferred embodiment of the present invention.

In describing the preferred embodiment of the invention, which is illustrated in the drawings, specific terminology will be resorted to for the sake of clarity. However, it is not intended that the invention be limited to the specific term so selected and it is to be understood that each specific term includes all technical equivalents, which operate in a similar manner to accomplish a similar purpose. For example, the word connected or term similar thereto is often used. They are not limited to direct connection, but include connection through other elements where such connection is recognized as being equivalent by those skilled in the art.

DETAILED DESCRIPTION OF THE INVENTION

Figure 2:
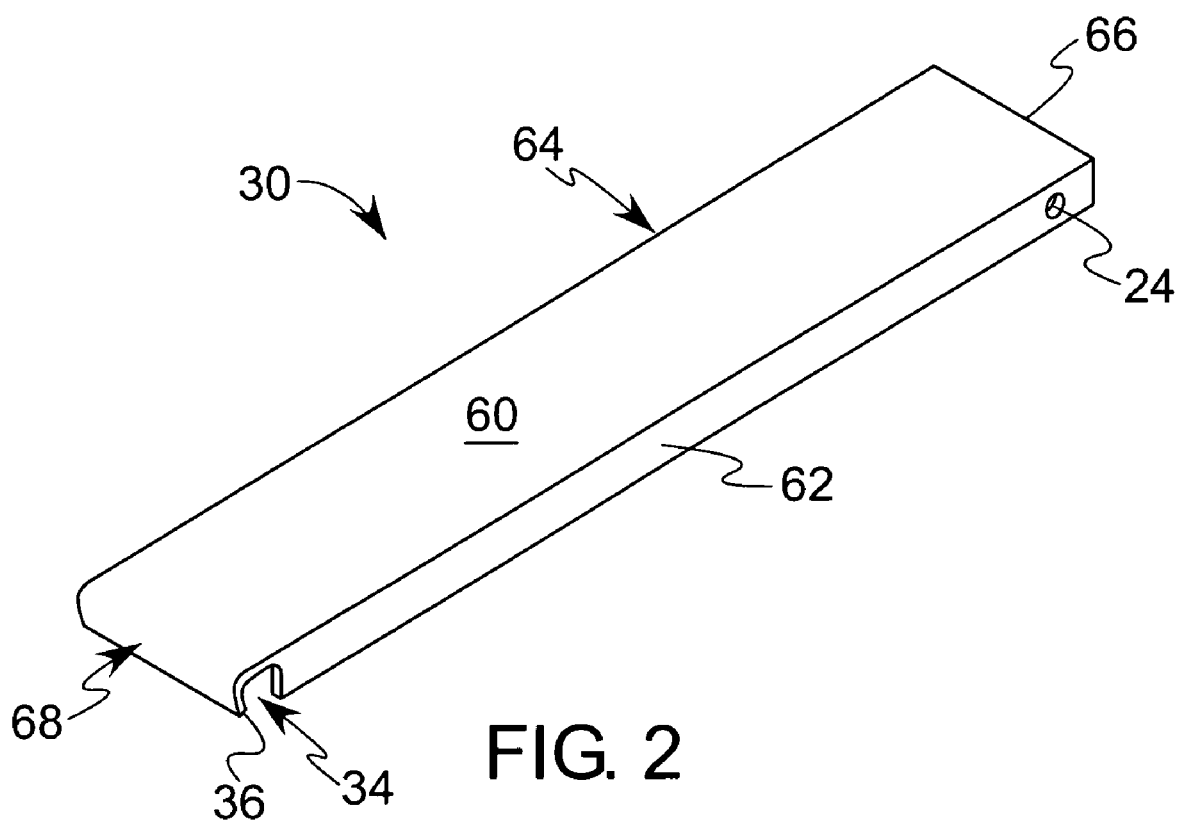
FIG. 2 is a view in perspective illustrating the preferred embodiment of the present invention.

The preferred embodiment of the present invention is illustrated in FIGS. 1-2. The ramp 30 is removably mounted to a sidewall of a cargo bed 12 of a vehicle 10. The preferred ramp 30 is an elongated plank 60 having two sidewalls 62 and 64 and two endwalls 66 and 68, as illustrated in FIG. 2. The term "ramp" is defined herein as an elongated member that can extend across a gap between two structures and support a load. For example, the ramp can be an aluminum c-channel or a composite plank. The top surface can have any useful properties, such as an imperforate surface, perforated surface, dimpled surface (e.g., non-skid surface) or conveyor roller surface so that the load can be elevated or lowered by movement of the load along the length of the ramp. However, the preferred surface is a suitable non-skid surface.

As illustrated in FIG. 1, a typical vehicle having a cargo bed 12 is a pickup truck. However, any vehicle having a cargo bed area can be used with the present invention, including a station wagon, SUV, dump truck or panel van, for example. The cargo bed 12 has four sidewalls 14, 16, 18 and 20. The sidewall 20 is the tailgate, shown in FIG. 1 in the "lowered position".

There are two ramps 30 and 32 removably mounted to the opposing sidewalls 14 and 18 of the cargo bed 12. The ramp 30 is removably mounted in a channel 40 found in the sidewall 14. The ramp 32 is not shown but is essentially identical to the ramp 30. A person of ordinary skill will recognize that there can be more or fewer ramps removably mounted to any of the four sidewalls of the cargo bed 12 or on the floor of the cargo bed 12.

Preferably, a hinge and locking mechanism mounts the ramp 30 to the sidewall 14 of the cargo bed 12. A lock 24 is mounted on one end of the ramp 30 for locking the ramp to a lock acceptor 26 in the sidewall 14. The lock 24 locks the ramp 30 in place in the sidewall 14 of the vehicle 10 so that the ramp 30 cannot disengage from the sidewall 14. The lock 24 can be any of a variety of locking mechanisms including a lynch pin, padlock, or combination lock. Preferably, a key unlocks and locks the lock 24. For example, the ignition key to the vehicle can be used, which provides extra security from theft.

As illustrated in FIGS. 1, 1A and 2, the ramp 30 also has a lip 36 that forms a hinge groove 34 on the endwall 68 opposite the lock 24. The cargo bed 12 has a hinge spine 38, opposite the lock acceptor 26, rigidly mounted to the sidewall 14 for being inserted into the hinge groove 34 of the ramp 30. The hinge groove 34 and hinge spine 38 create a hinge having a pivot axis A, and the hinge is easily disassembled by pivoting the ramp 30 out and removing the lip 36 from around the spine 38.

A downwardly facing edge 42 of the ramp 30 rests upon an upwardly facing edge of the channel 40 formed in the sidewall 14 of the cargo bed 12. A void is created within the sidewall 14 that can be used for storage of small items, such as flashlights, vehicle jacks, tire irons, and other tools, thereby allowing the user to free up space in the cab of the vehicle.

Figure 3:
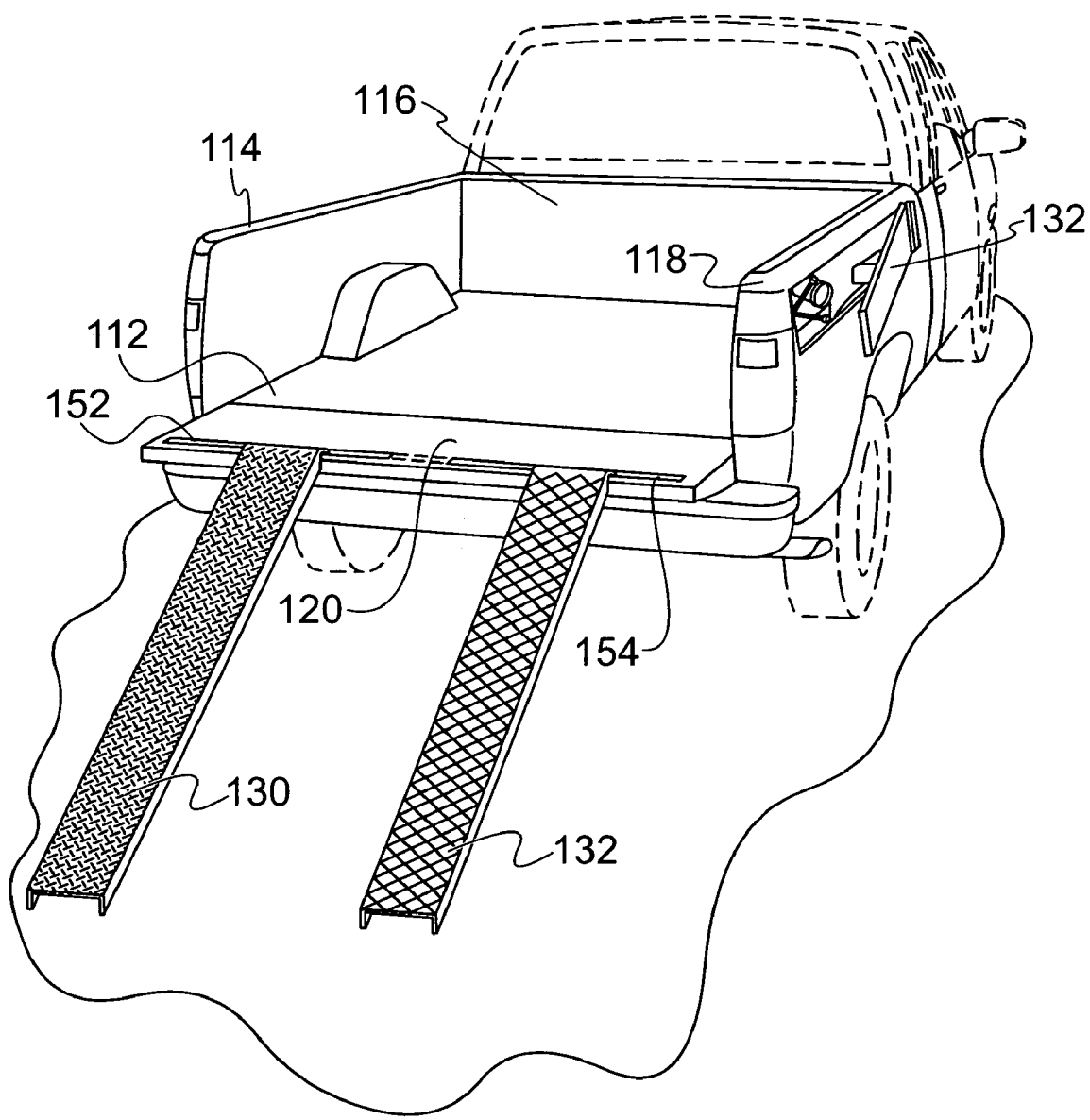
FIG. 3 is a view in perspective illustrating an alternative embodiment of the present invention during operation.

The alternative ramps 130 and 132 can be mounted to the exterior of the sidewalls 114 and 118 of the cargo bed 112, as illustrated in FIG. 3. The method of mounting and unmounting the ramps 130 and 132 follows the same steps as described for the ramps 30 and 32 that are stored on the interior of the sidewalls. There are many advantages to the alternative of FIG. 3, including greater accessibility. The ramps 130 and 132 are accessible to the user at all times, regardless of whether there is an object in the cargo bed 112 that would block access to the ramp in the FIG. 1 embodiment.

Figure 4:
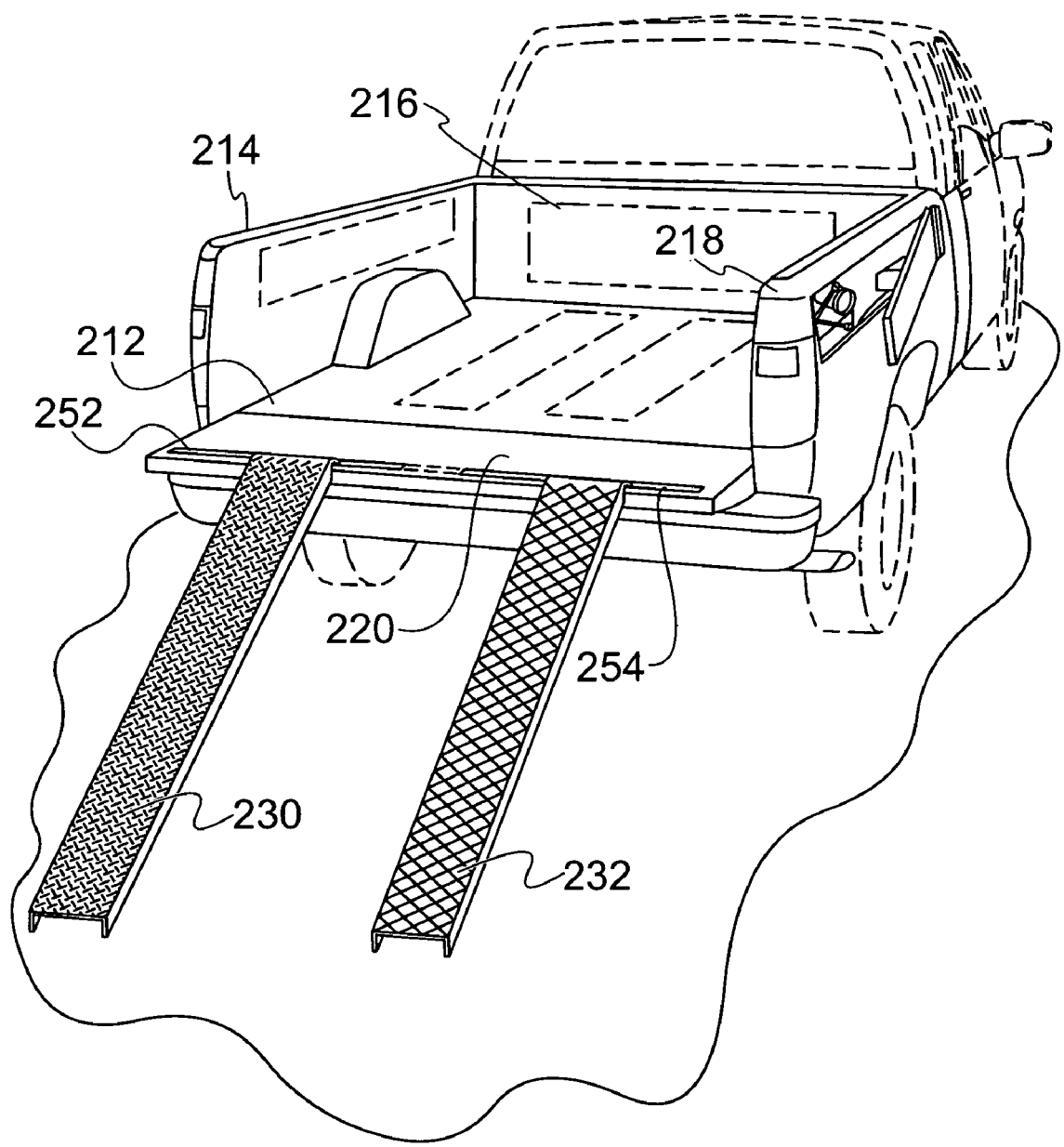
FIG. 4 is a view in perspective illustrating an alternative embodiment of the present invention during operation.

There are many alternate storage areas within the cargo bed that can be utilized to store the ramps according to the invention. As illustrated in FIG. 4 in phantom, ramps could be mounted to the interior of sidewalls 214, 216, 218, 220 or the floor of the cargo bed 212. The ramps 230 and 232 can be mounted to the exterior of sidewalls 214, 218 and 220. The dimensions of the ramps 230 and 232 will determine where the ramps are mounted to the vehicle, as will the space in the vehicle and the user's preferences. For example, if the ramps 230 and 232 are to be mounted to the tailgate 220 for storage, the ramps may need to be shorter in length in order to fit in the space provided by the tailgate 220. A person of ordinary skill will recognize that the dimensions of the ramp can vary.

In further alternative embodiments, the ramps 230 and 232 can be stored side-by-side on the same sidewall or one can be stored on the interior and one on the exterior of the same or differing sidewalls. Additionally, the ramps can be nested one inside the other and stored together in the same sidewall opening. Many storage combinations are possible.

Figure 2A:
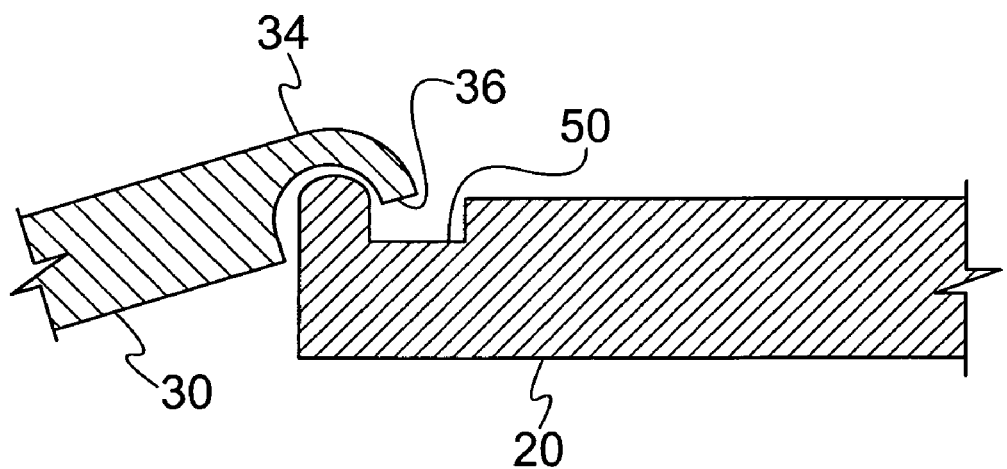
FIG. 2A is an enlarged side view in section illustrating the embodiment of FIG. 1 through the line 2A-2A.

Referring again to FIG. 1, the tailgate 20 has a groove 50 for accepting an end of the ramp 30. The lip 36 is inserted into the tailgate groove 50, as illustrated in FIG. 2A, during loading and unloading of a wheeled vehicle to prevent longitudinal movement of the ramp 30. Alternatively, there can be a plurality of grooves 152 and 154 separated from one another, as illustrated in FIG. 3 in the tailgate 120 for accepting the ramps 130 and 132.

When using the preferred embodiment of the present invention illustrated in FIG. 1, a person begins by unlocking the lock 24 of the first ramp 30 that is attached to the sidewall 14 of the cargo bed 12. Once the lock 24 is unlocked from the lock acceptor 26, the ramp 30 is free to move about the hinge. The user then pivots the ramp in a direction toward the center of the cargo bed 12 area, thereby rotating the hinge groove 34 of the ramp 30 about the hinge spine 38. Once the ramp 30 has been pivoted to a point where the lip 36 remains in contact with the hinge spine 38, but the ramp can be displaced laterally outwardly and slightly rearwardly to remove the hinge groove 34 from around the hinge spine 38, the ramp can be released from the sidewall 14. The user then releases the lip 36 from the hinge spine 38, removing the ramp 30 from the sidewall 14 of the cargo bed 12.

Once the ramp 30 is removed from the sidewall 14, the user can then use the ramp 30 in any manner desired. Preferably, the ramp 30 is mounted at one end to the tailgate 20 of the cargo bed 12 and the other end resting on the ground. The user accomplishes this by mounting the lip 36 of the hinge groove 34 into the groove 50 in the tailgate 20. As the lip 36 is mounted into the groove 50 the ramp 30 extends in a direction away from the cargo bed 12 and comes to rest upon the surface 22 desired by the user. This creates a bridge between the cargo bed 12 and the resting surface 22. The resting surface can be the ground, another loading surface or even a surface that has a height that is equal to the tailgate 20 of the vehicle, such as another vehicle.

In some cases, a user needs to utilize more than one ramp for loading or unloading an object. In this instance, after the first ramp 30 is removed and mounted to the tailgate 20 the second ramp 32 (not illustrated) may be removed from the sidewall 18 by unlocking the lock and pivoting the ramp about the hinge. The ramp 32 is not shown mounted in the sidewall 18, but its mounting structure is a mirror image of that for the ramp 30. Once removed, the lip of the second ramp 32 is mounted into the groove 50 of the tailgate 20, adjacent to the first ramp 30 similar to the ramps 130 and 132 of FIG. 3. The first ramp 30 is spaced from the second ramp 32 a distance desired for loading or unloading the object into or out of the cargo bed 12.

To mount the ramps 30 and 32 back in the sidewalls of the cargo bed 12, the user reverses the steps above. For the ramp 30, the lip 36 of the hinge groove 34 is removed from the tailgate groove 50 and the user then carries the ramp 30 to the sidewall 14 for storage. The hinge groove 34 is then aligned over the hinge spine 38 with the ramp angled as shown in FIG. 1, and the ramp 30 is pivoted about the hinge spine 38 in a direction toward the sidewall 14 of the vehicle 10. Once the ramp is in place, the lock 24 is locked to the lock acceptor 26 for maintaining the ramp 30 in the stored position. These steps are then followed for storing the second ramp 32.

While ramps have been utilized for many years, storage of the ramps has always been a problem. Once a user gets the desired object, such as a lawn mower or ATV into the cargo bed of the vehicle there is little room for also storing the ramps during travel to the next location. However, it is imperative that the user has the ramps at the next location. Otherwise, the lawnmower or ATV cannot be unloaded. The preferred embodiment of the present invention allows the user to transport the ramps at all times without having to store the ramps loosely in the cargo bed with the lawn mower or ATV. Each ramp in this embodiment has its own storage place within the vehicle and is accessible to the user at most or all times. This is advantageous over other methods of storing the ramps that may require extra attachment devices for storing the ramps during transport.

While certain preferred embodiments of the present invention have been disclosed in detail, it is to be understood that various modifications may be adopted without departing from the spirit of the invention or scope of the following claims.

The invention claimed is:

1. A ramp for supporting weight comprising:
   (a) a plank having at least two sidewalls and at least two endwalls, a hinge groove formed at one end of the ramp and a lock on an end opposite said hinge groove;
   (b) a cargo bed of a vehicle having a plurality of sidewalls and a channel formed in one of the cargo bed sidewalls, the ramp removably mounted in the channel with a downwardly facing edge of the ramp resting upon an upwardly facing edge of the channel, a hinge spine rigidly mounted to one of said cargo bed sidewalls near an end of the channel for inserting into the hinge groove of the ramp, thereby forming a hinge, wherein one of said sidewalls of the cargo bed is a tailgate having a groove that extends the length of the tailgate and is positioned near a top edge of the tailgate.

2. A ramp in accordance with claim 1, wherein the ramp end has a lip for inserting into the groove of the tailgate.

3. A method for using a ramp with a vehicle, the method comprising:
   (a) removably mounting a first ramp to at least one of a plurality of sidewalls of a cargo bed of the vehicle;
   (b) unlocking a lock on the first ramp;
   (c) pivoting the first ramp about a hinge and removing the first ramp from the sidewall; and
   (d) mounting a lip of the first ramp into a groove in a tailgate of the cargo bed.

4. The method in accordance with claim 3, further comprising:
   (a) unlocking a lock on a second ramp attached to a sidewall;
   (b) pivoting the second ramp about a second hinge and removing the second ramp from the second sidewall;
   (c) mounting a lip of the second ramp into the groove in the tailgate adjacent to the first ramp; and
   (d) spacing the second ramp from the first ramp a distance desired for loading or unloading an object into or out of the cargo bed.

* * * * *